UNITED STATES PATENT OFFICE.

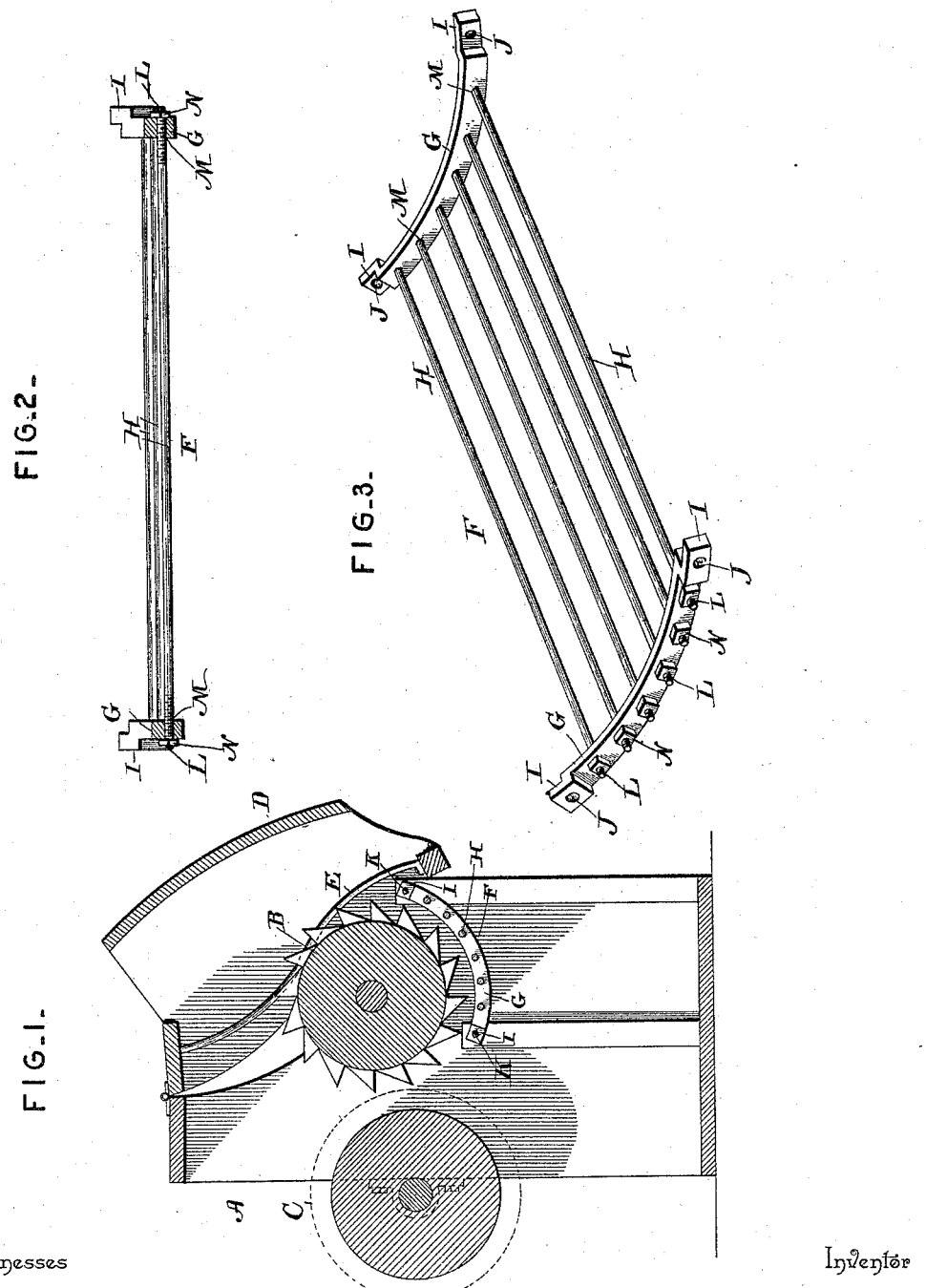

THOMAS FRANKLIN MARLOW, OF CARROLLTON, GEORGIA, ASSIGNOR OF ONE-HALF TO ROBERT HOUSWORTH, OF SAME PLACE.

GIN-SAW GUARD.

SPECIFICATION forming part of Letters Patent No. 492,500, dated February 28, 1893.

Application filed October 15, 1892. Serial No. 448,973. (No model.)

*To all whom it may concern:*

Be it known that I, THOMAS FRANKLIN MARLOW, a citizen of the United States, residing at Carrollton, in the county of Carroll and State of Georgia, have invented a new and useful Gin-Saw Guard, of which the following is a specification.

This invention relates to cotton gin attachments; and it has for its object to provide an improved guard attachment for cotton gins, adapted to be arranged in a proper position around the exposed edges of the saws so as to prevent the frequent accidents resulting from placing the hands and arms under the gin breast, in brushing away seeds or motes, which accumulate within the gin frame.

To this end and with this protection in view, the invention primarily contemplates an adjustable attachment, simple in construction and efficient in the use for which it is designed.

With these and other objects in view which fall within the scope of the invention, the same consists in the novel construction, combination, and arrangement of parts hereinafter more fully described, illustrated and claimed.

In the drawings:—Figure 1 is a transverse sectional view of the front end of a cotton gin, with the saw guard or fender in its proper position. Fig. 2 is a longitudinal sectional view of the saw guard or fender. Fig. 3 is detail perspective view of the saw guard or fender.

Referring to the accompanying drawings:—

A represents the front end of a cotton gin frame, in which is mounted the transverse series of gin saws B, adjacent to which travels the usual brush C, and which are partially inclosed at the front by the ordinary gin breast D. The gin breast D, is of the usual pattern, and carries the ordinary saw ribs E, all of which is well understood by those skilled in the art.

Directly under the transverse series of gin saws B, and extending partially to the front of the same, so as to cover the entire exposed front portion thereof, is the saw guard or fender F. The saw guard or fender F, comprises the opposite curved end bars G, and the intermediate parallel guard or fender rods H, connecting said end bars. The end bars G, are curved in a shape corresponding to the curvatures of the gin saws and are provided at each end thereof with the offstanding securing lugs or shoulders I, having the perforations J, to receive the attaching screws K, passing therethrough and into the opposite sides of the gin frame, so as to hold the fender or guard in proper position beneath the saw. It will be noted that by having the offstanding lugs or shoulders, which alone touch the sides of the gin frame, the main portion of the end bars are held away from the frame, so as to leave a space for the projecting threaded ends L, of the parallel guard or fender rods H. The threaded ends L, of the rods project through perforations M, in the opposite end bars, and receive on such threaded ends outside of said bars, the adjusting nuts N. By means of the nuts N, the length of the attachment or guard F, may be adjusted to exactly correspond with the small variations of width of different gin breasts, so that the attachment can be readily attached to any class of gins varying but slightly in size.

The attachment or guard herein described, is set a suitable distance below and in front of the gin saws underneath the gin breast, so as to avoid the possibility of the gin attendant being lacerated by the revolving saws while attending to his duties, and it will of course be understood that to this end the guard may be constructed with the rods suitable distances apart, and the curvature of the entire attachment changed and modified to suit the discretion of the manufacturer.

It is now thought that the construction, operation and many advantages of the herein described gin saw or fender are readily apparent.

Having thus described my invention, what I desire to secure by Letters Patent is—

1. A longitudinally adjustable gin saw guard or fender adapted for removable attachment to gins of various widths, substantially as set forth.

2. A gin saw guard or fender comprising opposite curved end bars adapted to be removably secured to the sides of a gin frame under the saws, and the parallel rods adjustably connected at their ends to said bars to adapt the guard or fender to gins of various widths, substantially as set forth.

3. A gin saw guard or fender comprising opposite curved end bars, having offstanding securing lugs or shoulders adapted to be secured to the sides of a gin frame under the saws, and a series of perforations between the lugs, a series of parallel rods having threaded ends projecting through the perforations in said bars, and adjusting nuts engaging the threaded ends of said rods outside of the bars so as to adapt the fender or guard to gins of various widths, substantially as set forth.

In testimony that I claim the foregoing as my own I have hereto affixed my signature in the presence of two witnesses.

THOMAS FRANKLIN MARLOW.

Witnesses:
W. W. ROOP,
J. T. SMITH.